Jan. 13, 1925.

J. A. GERMONPREZ

BRAKE BAND ANCHOR

Filed April 25, 1924

1,523,115

Inventor
John A. Germonprez

By

Attorneys

Patented Jan. 13, 1925.

1,523,115

UNITED STATES PATENT OFFICE.

JOHN A. GERMONPREZ, OF DETROIT, MICHIGAN.

BRAKE-BAND ANCHOR.

Application filed April 25, 1924. Serial No. 708,883.

*To all whom it may concern:*

Be it known that I, JOHN A. GERMONPREZ, a citizen of the United States, residing at Detroit, in the county of Wayne and State of Michigan, have invented certain new and useful Improvements in Brake-Band Anchors, of which the following is a specification, reference being had therein to the accompanying drawings.

This invention relates to vehicle brakes and more particularly to a brake band mounting or anchorage, and its object is to simplify and cheapen construction, insure efficient operation, eliminate the necessity for lubrication, and prevent rattling or noise due to vibration of loose parts. A further object is to secure certain other advantages, due to the construction and arrangement of parts, all as hereinafter more fully described.

With the above and other ends in view, the invention consists in the matters hereinafter set forth and more particularly pointed out in the appended claims, reference being had to the accompanying drawing in which—

Figures 1, 2, 3:
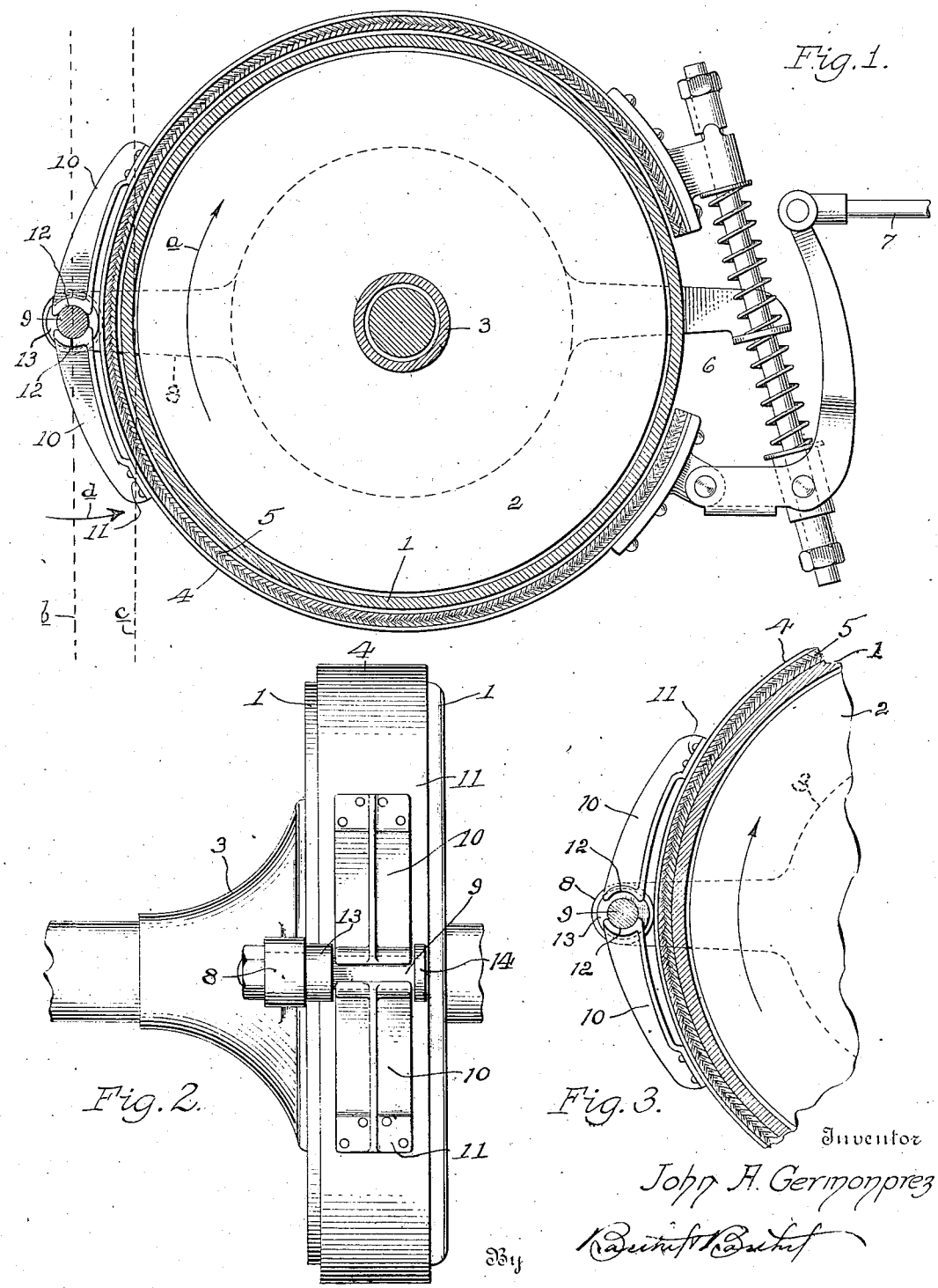
Figure 1 is a side elevation of an external brake assembly embodying and illustrative of the invention.
Fig. 2 is a rear elevation of the same.
Fig. 3 is a detail illustrating the operation of an anchor constructed in accordance with the invention, and showing the parts with the brake set, the movement of the parts being exaggerated to more clearly show their operation.

In the drawing 1 indicates the usual brake drum which is attached to and turns with the vehicle wheel, 2 a disk or plate which is secured to the fixed or non-rotatable axle housing 3, and 4 is the usual flexible brake band provided with the usual lining 5 of friction material to engage the external surface of the brake drum 1. The free ends of the brake band 4 are operatively connected in any suitable manner as by the usual lever mechanism indicated as a whole by the numeral 6 and operated in the usual manner by a rod 7 to pull the free ends of the band toward each other and contract the band about the drum to bring it into frictional contact therewith.

It is necessary to provide means for anchoring the brake band intermediate its ends so that it will be held against rotation with the drum and thus frictionally resist the rotation of the drum and its wheel when the band is brought into contact with the drum. As usually constructed, this anchorage comprises a fixed member and a member secured to the band and slidable upon the fixed member toward and from the drum, a spring being provided to move the member and normally hold the band out of contact with the drum, the band being moved into contact with the drum against the action of said spring by the contracting of the band. This movement of the band relative to its anchorage, is usually, radially inward of the drum and when the band is brought into contact with the rotating drum, the force applied by the drum to the band is laterally of the inward movement of the band upon its anchorage. Unless the parts are well lubricated, the band will not move inward upon its anchor bracket but will stick and therefore the intermediate portion of the band will not come into contact with the drum upon the application of the brakes but the end portions only of the band will engage the drum, and the efficiency of the brake is greatly reduced. Further the inward sliding of the band upon its anchorage is often hindered or prevented by dirt or rust and as these parts are so positioned that they can not be protected, they seldom work freely and function properly so that full contact is secured throughout the full length of the band.

To insure the free movement of the brake band throughout its length toward the brake drum whenever the brake lever mechanism 6 is operated, an anchor bracket 8 is formed integral with, or otherwise made fast to the fixed axle housing 3 and this bracket carries a fixed pin 9 which extends laterally from the bracket across and spaced from the drum surface. The band 4 encircles the drum with its intermediate portion between this pin and the drum face and is anchored to the pin by means of arms 10 which are riveted or otherwise rigidly secured at one end, as at 11, to the band. The opposite ends of these arms which are unattached to the band are each formed with a semi-circular end seat 12 to seat upon the pin 9 and are otherwise unattached to the pin. These arms are also unconnected except by the band, and the pin is formed with end collars or shoulders 13 and 14 between which the free ends of the arms seat on the pin, to prevent lateral movement of these arms and the band.

When the band is in expanded condition as shown in Fig. 1, it is supported intermediate its ends by the engagement of the arms with the pin and is supported at its ends in the usual manner by the lever mechanism 6 so that it is out of contact with the drum surface and the drum and wheel may turn freely, said lever mechanism being so adjusted and the parts so proportioned that there will normally be a clearance between the drum and band. To prevent any play between the arms 10 and pin when the band is in expanded condition, and thus prevent rattling, said arms are attached to the band in such a position that the expansion of the band will bring the arms endwise toward each other and firmly clamp the pin between their adjacent concaved or semi-circular ends 12, but upon contraction of the band, these arms will be moved slightly thereby, away from each other to free the pin so that they may turn freely thereon and rust or dirt will not interfere with such turning movement.

The band is thus normally supported intermediate its ends by the anchor-bracket-pin out of contact with the drum and is firmly held in contact with the pin against rattling by the expansion of the band, and as each arm is secured to the band at one end only and at a considerable distance around the drum from the anchor pin, when the band is contracted these arms swing freely in contact with the pin, their ends which are attached at 11 to the band, swinging inwardly toward the drum with the movement of the band toward the drum surface.

As illustrated in Fig. 3, when the band is contracted upon the drum to retard the rotation of the drum and wheel in the direction of the arow $a$ in said Fig. 1, the frictional contact of the band with the rotating drum tends to move the band also in the direction of the arrow, forcing the arm at the lower side of the pin into firmer contact therewith, but as the pin is fixed, it simply forms a stop to prevent rotation of the band with the drum, and as the arm is free to turn upon this stop pin and is at its opposite end secured to the band laterally toward the drum from the vertical plane of the axis of the pin 9, which plane is indicated by the dotted line $b$, said arm will be swung by the turning force of the drum frictionally applied to the band, inwardly or toward the drum and cause the band which is secured to said end, to engage the drum surface with added force proportionate to the turning force applied to the band by the drum. The opposite arm, or arm at the upper side of the pin is unattached to the pin, and therefore this movement of the band is unhindered by it, as said upper arm is free to move away from its seat on the pin as illustrated in Fig. 3, such movement being exaggerated in said figure, for the purpose of illustrating the action which takes place. The anchorage or point at which the band is held, is therefore transferred from a point within the vertical plane $b$ of the pin 9 to a point at which the arm is secured to the band, which point of attachment is within a vertical plane indicated by the dotted line $c$, which plane is laterally of the plane $b$ toward the drum, and the pin 9 simply forms a stop around which the arm is swung by the turning force of the drum frictionally applied to the band, due to the attachment of the band to the arm at 11 which is off-center of the pin. The end portion of the band at the lower side of the drum is thus brought into firm contact with the drum and the greater the turning force applied to the band by the drum, the greater will be the frictional contact between band and drum. As the upper arm 10 is free to move with that portion of the band to which it is attached, the upper portion of the band from the point 11 at which the lower arm is secured thereto, is free to wrap itself around the drum, the upper arm moving away from the pin slightly as the lower arm swings inwardly in the direction of the arrow $d$ about the pin axis, its point of attachment 11 thus swinging upwardly a very slight distance and carrying the band with it.

It will thus be seen that the movement of the band toward the drum upon contraction of the band, is insured under all conditions as there is no sliding movement between the parts of the anchorage and only a very slight rotating movement of one of the arms in contact with its anchor pin, the other arm ceasing to function immediately after the brake is applied and moving freely with the band. As the band is continuous past its anchorage, it is brought into frictional contact with the drum throughout its entire length upon being contracted by the lever mechanism 6, and this frictional contact of band with revolving drum, tends to swing one of the anchor arms toward the drum with consequent increase in frictional contact between band and drum proportionate to the turning force applied to the band by the drum.

As will be seen, the position of pin 9 relative to the band 4, is such that a line tangent to the band at the point of connection of the band with at least one—preferably of either of the two—of the arms 10, lies within a circle which has its center coincident with the axis of pin 9 and which has as its radius a length corresponding to the length of a radius of the pin. As a result, the action is such that creeping of the band by brake application is reduced to its minimum.

When the drum is turning in a direction opposite to that shown by the arrow *a* in Fig. 1, the action is reversed, the upper arm 10 then forming the anchor for the band and the lower arm becoming inoperative.

Obviously the particular form or construction of the anchor arms and their arrangement as well as that of other parts of the anchor may be varied within the scope of the appended claims to suit the particular conditions of installation and without departing from the spirit of the present invention, and I do not therefore limit myself to the particular construction or arrangement shown.

What I claim is:—

1. In a brake mechanism wherein a friction member is brought into frictional contact with a rotatable member to frictionally retard the rotation thereof, means for preventing rotation of said friction member with said rotatable member when brought in frictional contact therewith, said means including a fixed member, a swinging member engaging said fixed member and connected to said friction member to be swung toward said rotatable member by frictional contact of the friction member with the rotatable member when said latter member is in rotation, the position of the fixed member relative to the friction member being such that a line tangent to the friction member at the point of connection of the friction and swinging members lies within a circle which has its center coincident with the axis of the fixed member and which has a radius length corresponding to the length of a radius of such fixed member.

2. In a brake mechanism wherein a friction member is brought into frictional contact with a rotatable member to frictionally retard the rotation thereof, an anchorage for the friction member including a fixed member and a member connected to said friction member to turn upon said fixed member and move said friction member into frictional contact with said rotatable member, the position of the fixed member relative to the friction member being such that a line tangent to the friction member at the point of connection of the friction and turning members lies within a circle which has its center coincident with the axis of the fixed member and which has a radius length corresponding to the length of a radius of such fixed member.

3. In a brake mechanism wherein a friction member is brought into frictional contact with a rotatable member to frictionally retard the rotation thereof, means for preventing rotation of the friction member with said rotatable member, said means comprising a fixed abutment and a member connected to said friction member to engage said abutment and be turned thereon by the rotative force applied to the friction member by rotation of the rotatable member to move said member into frictional contact with the rotatable member, the position of the fixed abutment relative to the friction member being such that a line tangent to the friction member at the point of connection of the friction and turning members lies within a circle which has its center coincident with the axis of the fixed abutment and which has a radius length corresponding to the length of a radius of such fixed abutment.

4. In a brake mechanism wherein a friction member is brought into frictional contact with a rotatable member to frictionally retard the rotation thereof, means for preventing rotation of said friction member with said rotatable member, said means including a fixed abutment member and a pair of members connected to said friction member and arranged to engage said abutment member in opposed relation and to be swung thereon by the force applied to the friction member by the turning of the rotatable member in frictional contact with the friction member, the position of the fixed abutment member relative to the friction member being such that a line tangent to the friction member at the point of connection of said friction member and at least one of said swinging members lies within a circle which has its center co-incident with the axis of the abutment member and which has a radius length corresponding to the length of a radius of such abutment member.

5. In a brake mechanism wherein a friction member is brought into frictional contact with a rotatable member to frictionally retard the rotation thereof, an anchorage for the friction member including a fixed member, and a pair of members connected to the friction member laterally of the vertical plane of the axis of rotation of said members about said fixed member and formed to abut the fixed member, the position of the fixed member relative to the friction member being such that a line tangent to the friction member at the point of connection of said friction member and at least one of said swinging members lies within a circle which has its center coincident with the axis of the fixed member and which has a radius length corresponding to the length of a radius of such fixed member.

6. In a brake mechanism wherein a friction member is brought into frictional contact with a rotatable member to frictionally retard the rotation thereof, an anchorage for the friction member including a fixed member, and a pair of members connected at one end to the friction member and formed at their opposite ends to abut the fixed member, and unconnected to the fixed member, the position of the fixed member relative to the friction member being such that a line tangent to the friction member at the point of connection of the friction member and either of such pair of members lies within a circle which has its center coincident with the axis of the fixed member and which has a radius length corresponding to the length of a radius of such fixed member.

7. In a brake mechanism wherein a friction member is brought into frictional contact with a rotatable member to frictionally retard the rotation thereof, an anchorage for the friction member including a fixed abutment member and a pair of members connected at one end to the abutment member to turn thereon and at their opposite ends to the friction member laterally of the vertical plane of the axis of rotation of said members about the abutment member to be turned upon said abutment member toward said rotatable member by the turning force applied to the friction member by the engagement of the rotatable member therewith, the position of the fixed member relative to the friction member being such that a line tangent to the friction member at the point of connection of said friction member and at least one of said pair of members lies within a circle which has its center coincident with the axis of the fixed member and which has a radius length corresponding to the length of a radius of such fixed member.

8. In a brake mechanism wherein a friction member is brought into frictional contact with a rotatable member to frictionally retard the rotation thereof, an anchorage for the friction member including a fixed abutment member and a pair of members connected at one end to the friction member with the opposite end of each of the pair of members extending in a common plane and in spaced relation to each other to place such ends in directly-opposed relation, with such ends adapted to abut the abutment member and turn thereon when turning force is applied to the friction member by the engagement of the rotatable member therewith.

9. In a brake mechanism wherein a friction band is brought into frictional contact with a rotatable member to retard the rotation thereof, an anchorage for the band including a stationary fixed member extending across and in spaced relation to a continuous portion of said band and the member connected at one end to the continuous portion of the band laterally of the vertical plane of said fixed member and engaging said fixed member at its opposite end to be turned thereon toward the rotatable member by the turning force applied to the band by the turning of the rotatable member in contact therewith when the band is moved into frictional contact with said rotatable member, the position of the fixed member relative to the band being such that a line tangent to the band at the point of connection of the band and the swinging member lies within a circle which has its center coincident with the axis of the fixed member and which has a radius length corresponding to the length of a radius of such fixed member.

10. In a brake mechanism wherein a friction band is brought into frictional contact with a rotatable member to retard the rotation thereof, an anchorage for the band including a stationary fixed member extending across and in spaced relation to a continuous portion of said band, and a pair of members connected to said continuous portion of the band to move therewith and engaging said stationary fixed member at their opposite ends in opposed relation to each other and in a common plane intersecting the axis of the stationary member to turn upon the stationary member and permit a free movement of the band toward said rotatable member.

11. In a brake mechanism including a rotatable drum and a brake band to frictionally engage the drum, an anchorage for said band including a fixed stationary member and an arm connected at one end to said band and abutting and unconnected to said fixed member at its opposite end to swing thereon toward the drum when the band is brought into frictional contact with the drum, the position of the stationary member relative to the band being such that a line tangent to the band at the point of connection of the arm and the band lies within a circle which has its center coincident with the axis of the stationary member and which has a radius length corresponding to the length of a radius of such stationary member.

12. In a brake mechanism including a rotatable drum and a brake band to frictionally engage the drum, an anchorage for said band including a fixed stationary member extending across and in spaced relation to a continuous portion of the band, and a pair of arms rigidly secured at one end to said continuous portion of the band with the opposite end of each of said pair of arms in opposed spaced relation with such ends in contact with opposite sides of said fixed stationary member.

13. In a brake mechanism including a rotatable member and a brake band to frictionally engage said member, an anchorage for said band including a pair of arms secured to a continuous portion of the band with adjacent ends in opposed and spaced relation, and a fixed member extending between the opposed ends of the arms with the arms normally held in yielding contact with the fixed member at their opposed ends, the position of the fixed member relative to the band being such that a line tangent to the band at the point of connection of either of said arms to the band lies within a circle which has its center coincident with the axis of the fixed member and which has a radius length corresponding to the length of a radius of such fixed member.

14. In a brake mechanism including a rotatable drum and a friction band to engage the drum, an anchorage for the intermediate portion of the friction band including a fixed pin extending transversely of the band and spaced therefrom, and a pair of arms rigidly secured at one end to the continuous portion of the band with their opposite ends in opposed and spaced relation and formed to engage opposite sides of the pin and turn thereon, the position of the pin relative to the band being such that a line tangent to the band at the point of connection of at least one of said arms with the band lies within a circle which has its center coincident with the axis of the pin and which has a radius length corresponding to the length of a radius of such pin.

15. In a brake mechanism, the combination with a rotatable drum, a friction band encircling the drum, and means connecting the free ends of the band to contract the band upon the drum; of an anchorage for the intermediate portion of the band, said anchorage including a fixed bracket having a pin extending transversely of the intermediate portion of the band, and a pair of arms rigidly secured at opposite ends to the band with their adjacent ends in spaced relation and formed to engage and turn upon opposite sides of the pin, the position of the pin relative to the band being such that a line tangent to the band at the point of connection of at least one of said arms with the band lies within a circle which has its center coincident with the axis of the pin and which has a radius length corresponding to the length of a radius of such pin.

16. In a bracket mechanism, the combination with a rotatable drum, a friction band encircling the drum, and means connecting the free ends of the band to contract the band into engagement with the drum; of an anchorage for the intermediate portion of the band, said anchorage including a bracket fixed against rotation with the drum, a pin extending laterally from the bracket across the intermediate portion of the band and formed with spaced apart shoulders, and a pair of arms rigidly secured at one end to the intermediate portion of the band at a distance from said pin, with the opposed ends of the arms extending in a common plane in spaced relation and formed to engage opposite sides of the pin between the shoulders thereof, said arms being normally held in yielding contact with the pin by the expanding action of the band.

In testimony whereof I affix my signature in presence of two witnesses.

JOHN A. GERMONPREZ.

Witnesses:
ANNA M. DORR,
LEWIS E. FLANDESS.